(12) United States Patent
Misawa

(10) Patent No.: US 9,131,157 B2
(45) Date of Patent: Sep. 8, 2015

(54) CAMERA AND METHOD OF CONTROLLING OPERATION OF SAME

(71) Applicant: FUJIFILM Corporation, Tokyo (JP)

(72) Inventor: Atsushi Misawa, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/593,155

(22) Filed: Jan. 9, 2015

(65) Prior Publication Data

US 2015/0124131 A1 May 7, 2015

Related U.S. Application Data

(63) Continuation of application No. PCT/JP2013/065034, filed on May 30, 2013.

(30) Foreign Application Priority Data

Jul. 20, 2012 (JP) ................................ 2012-161751

(51) Int. Cl.
| | |
|---|---|
| H04N 5/222 | (2006.01) |
| G03B 13/02 | (2006.01) |
| G03B 13/06 | (2006.01) |
| G03B 13/08 | (2006.01) |
| H04N 5/232 | (2006.01) |
| H04N 5/235 | (2006.01) |
| G03B 7/00 | (2014.01) |
| H04N 5/335 | (2011.01) |

(52) U.S. Cl.
CPC .............. *H04N 5/23293* (2013.01); *G03B 7/00* (2013.01); *H04N 5/2228* (2013.01); *H04N 5/235* (2013.01);

(Continued)

(58) Field of Classification Search
CPC .......... H04N 5/23212; H04N 5/23293; H04N 5/335; H04N 5/235; H04N 5/2228; H04N 5/232; G03B 7/00; G03B 13/00–13/08; G03B 2213/00–2213/025
USPC ............. 348/333.01–333.04, 333.08, 333.09, 348/333.11, 333.12; 396/148, 373, 374, 396/380, 384–386
See application file for complete search history.

(56) References Cited

U.S. PATENT DOCUMENTS

| | | | |
|---|---|---|---|
| 4,571,627 A | * | 2/1986 | Stempeck ................ 348/333.09 |
| 5,161,025 A | | 11/1992 | Nakao |

(Continued)

FOREIGN PATENT DOCUMENTS

| | | |
|---|---|---|
| JP | 3-292067 A | 12/1991 |
| JP | 8-160518 A | 6/1996 |

(Continued)

OTHER PUBLICATIONS

International Search Report, issued in PCT/JP2013/065034, dated Jul. 9, 2013.

(Continued)

*Primary Examiner* — Sinh Tran
*Assistant Examiner* — Mark Monk
(74) *Attorney, Agent, or Firm* — Birch, Stewart, Kolasch & Birch, LLP

(57) ABSTRACT

The image in an electronic viewfinder is made larger than the image in an optical viewfinder. Specifically, a finder unit is provided with a region that displays a portion of the display screen of an electronic viewfinder alongside a region that displays the optical image of a subject. When the camera has been set to an optical/electronic hybrid viewfinder, the optically formed optical image of a subject is displayed in the region and a portion of the image of the subject captured by a solid-state electronic image sensing device is displayed in the region. When the camera has been set to the electronic viewfinder, a landscape-oriented image of the subject captured by the solid-state electronic image sensing device is displayed across both of the regions.

4 Claims, 10 Drawing Sheets

(52) U.S. Cl.
CPC ........... *H04N 5/23212* (2013.01); *H04N 5/335* (2013.01); *G03B 13/08* (2013.01); *G03B 2213/025* (2013.01)

(56) References Cited

U.S. PATENT DOCUMENTS

| | | | | |
|---|---|---|---|---|
| 6,549,237 | B1 * | 4/2003 | Inuma et al. | 348/333.06 |
| 7,428,381 | B2 * | 9/2008 | Koppetz | 396/296 |
| 7,705,907 | B2 * | 4/2010 | Iwane | 348/341 |

FOREIGN PATENT DOCUMENTS

| | | | |
|---|---|---|---|
| JP | 2002-152558 | A | 5/2002 |
| JP | 2010-16615 | A | 1/2010 |
| JP | 2012-65294 | A | 3/2012 |

OTHER PUBLICATIONS

Written Opinion of the International Searching Authority, issued in PCT/JP2013/065034, dated Jul. 9, 2013.

* cited by examiner

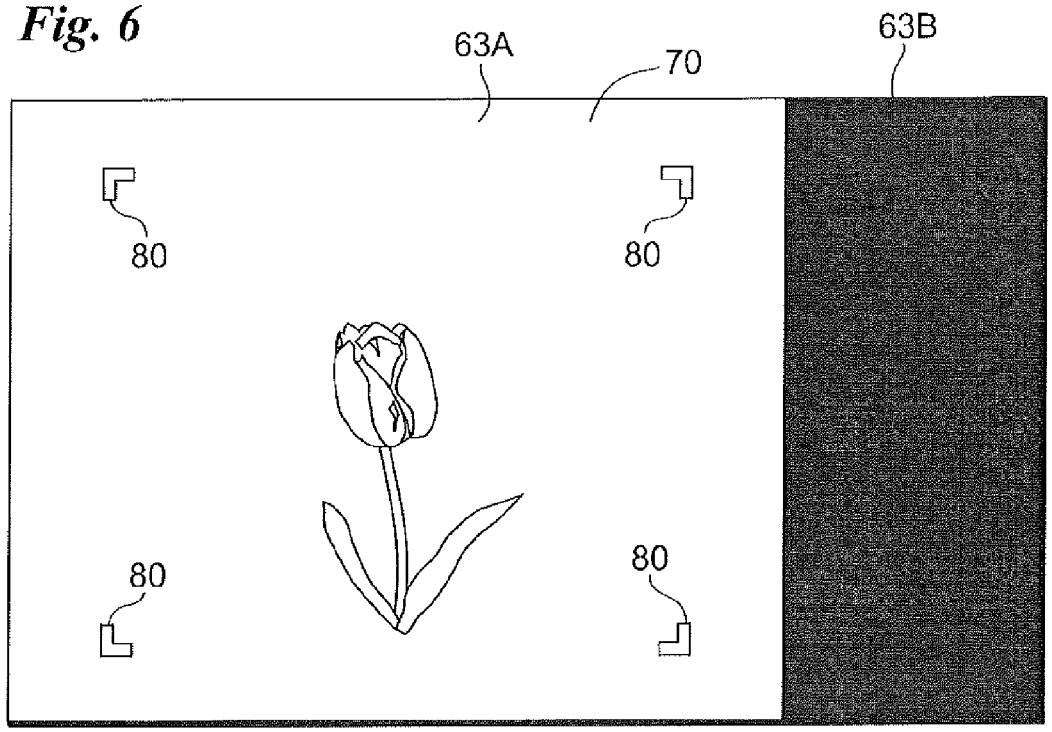
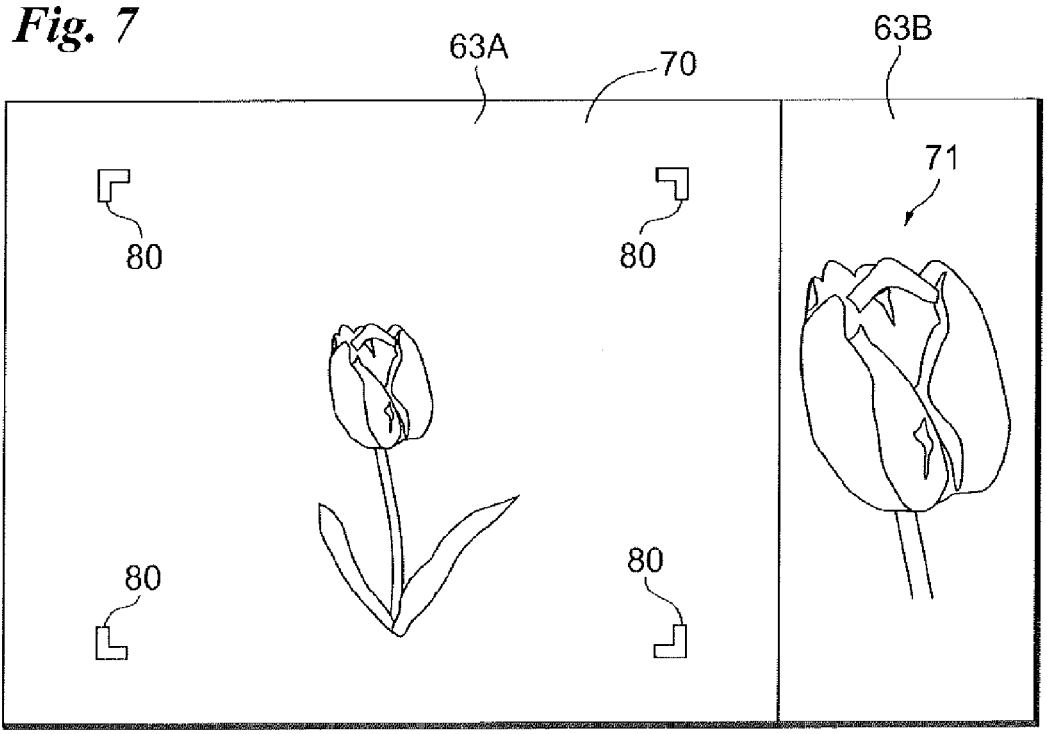

CAMERA AND METHOD OF CONTROLLING OPERATION OF SAME

CROSS-REFERENCE TO RELATED APPLICATIONS

This application is a Continuation of PCT International Application No. PCT JP2013/065034 filed on May 30, 2013, which claims priority under 35 U.S.C. §119(a) to Japanese Patent Application No. 2012-161751 filed Jul. 20, 2012. Each of the above application(s) is hereby expressly incorporated by reference, in its entirety, into the present application.

BACKGROUND OF THE INVENTION

1. Field of the Invention

This invention relates to a camera and to a method of controlling the operation thereof.

2. Description of the Related Art

Finder devices include an optical/electronic hybrid viewfinder having both an optical finder function, which forms the optical image of a subject and allows the user to see this optical image of the subject through an eyepiece window, and an electronic viewfinder function, which displays the image of a subject, captured by imaging, on a liquid crystal display unit and allows the user to see this image of the subject through the eyepiece window. In finder devices of this kind, there is one which blocks a portion of the light rays from the objective of the optical finder and displays an electronic image in this portion (Patent Document 1). In an optical/electronic hybrid viewfinder, information such as a visual-field frame displayed on a liquid crystal display unit can be displayed by being superimposed upon the optical image of a subject. Further, there is a camera in which a finder optical system is provided with a visual-field mask and the image on a liquid crystal display unit is displayed on the portion masked by the visual-field mask (Patent Document 2). Furthermore, since a lens exhibits aberration, there are cameras that perform an aberration correction (Patent Document 3).

Patent Document 1: Japanese Patent Application Laid-Open No. 2002-152558

Patent Document 2: Japanese Patent Application Laid-Open No. 2010-16615

Patent Document 3: Japanese Patent Application Laid-Open No. HEI8-160518

However, there is not much meaning in having the functions of both an optical/electronic hybrid viewfinder and an electronic viewfinder in an arrangement in which the optical image of a subject that can be seen when the finder device is utilized as an optical/electronic hybrid viewfinder and the optical image of a subject displayed on a liquid crystal display unit when the finder device is utilized as an electronic viewfinder appear as images of the same size.

SUMMARY OF THE INVENTION

An object of the present invention is to arrange it so that when a finder device functions as an electronic viewfinder, the image of the subject obtained will be larger than the image of the subject obtained when the finder device functions as an optical/electronic hybrid viewfinder.

According to the present invention, there is provided a camera comprising: a finder unit formed on the front of the camera and having an objective window facing a subject and an eyepiece window for looking at an optical image of the subject seen through the objective window; a solid-state electronic image sensing device for imaging a subject and outputting image data representing the image of the subject; a display unit for displaying an image of the subject, which has been imaged by the solid-state image sensing device, on a display screen; a deflecting optical system in which there are formed a transmissive region, which transmits the optical image of the subject seen through the objective window, and a mask region defined along the horizontal direction or vertical direction of the transmissive region for blocking entrant light, the deflecting optical system introducing the image of the subject, which is being displayed on the display screen of the display unit, to the eyepiece window; a shutter device, which is provided between the subject and the deflecting optical system, for freely blocking light rays impinging thereon through the objective window; a shutter control device for controlling the shutter device so as not to block the light rays impinging thereon through the objective window in a case where the finder unit is utilized as an optical/electronic hybrid viewfinder, and controlling the shutter device so as to block the light rays impinging thereon through the objective window in a case where the finder unit is utilized as an electronic viewfinder; and a display control device for controlling the display unit so as to display information at such a position where it will be introduced to the eyepiece window so as to overlap the mask region in a case where the finder unit is utilized as an optical/electronic hybrid viewfinder, and controlling the display unit so as to display the image of the subject at such a position where it will be introduced to the eyepiece window so as to overlap a region, which is a combination of the mask region and the transmissive region, in a case where the finder unit is utilized as an electronic viewfinder.

The present invention also provides an operation control method suited to the above-described camera. Specifically, the present invention provides a method of controlling operation of a camera which includes a finder unit formed on the front of the camera and having an objective window facing a subject and an eyepiece window for looking at an optical image of the subject seen through the objective window, the method comprising steps of: a solid-state electronic image sensing device imaging a subject and outputting image data representing the image of the subject; a display unit displaying an image of the subject, which has been imaged by the solid-state image sensing device, on a display screen; a deflecting optical system introducing the image of the subject, which is being displayed on the display screen of the display unit, to the eyepiece window, wherein there are formed in the deflecting optical system a transmissive region, which transmits the optical image of the subject seen through the objective window, and a mask region defined along the horizontal direction or vertical direction of the transmissive region for blocking entrant light; a shutter device, which is provided between the subject and the deflecting optical system, freely blocking light rays impinging thereon through the objective window; a shutter control device controlling the shutter device so as not to block the light rays impinging thereon through the objective window in a case where the finder unit is utilized as an optical/electronic hybrid viewfinder, and controlling the shutter device so as to block the light rays impinging thereon through the objective window in a case where the finder unit is utilized as an electronic viewfinder; and a display control device controlling the display unit so as to display information at such a position where it will be introduced to the eyepiece window so as to overlap the mask region in a case where the finder unit is utilized as an optical/electronic hybrid viewfinder, and controlling the display unit so as to display the image of the subject at such a position where it will be introduced to the eyepiece window so as to overlap a region, which is a combination of the mask region and the transmissive region, in a case where the finder unit is utilized as an electronic viewfinder.

In accordance with the present invention, if a finder unit is utilized as an optical/electronic hybrid viewfinder, a shutter device is controlled so as not to block light rays incident thereon through the objective window of the finder unit, and a display unit is controlled so as to display information at such a position where the information will be introduced to an eyepiece window so that it will overlap a mask region of a deflecting optical system. The user looking through the objective window of the finder unit can see the optical image of the subject when the user looks at a transmissive region and can see the information being displayed on a display screen when the user looks at the mask region. On the other hand, if a finder unit is utilized as an electronic viewfinder, the shutter device is controlled so as to block light rays incident thereon through the objective window of the finder unit. The user, therefore, cannot see the optical image of the subject even if he looks at the transmissive region. Further, the display unit is controlled so as to display the image of the subject at such a position where the image will be introduced to the eyepiece window so that it will overlap a region that is a combination of the mask region and the transmissive region of the deflecting optical system. The user looking through the objective window of the finder unit sees the region that is a combination of both the mask region and the transmissive region, whereby the user is able to see the image of the subject displayed on the display unit. Since the image of the subject displayed on the liquid crystal display unit has the same size as that of the region that is a combination of both the mask region and the transmissive region, it is comparatively large. Thus the user can see an image of the subject that is larger than the optical image of the subject.

By way of example, in a case where the finder unit is utilized as an optical/electronic hybrid viewfinder, the display control device controls the display unit so as to display the image of a subject, which represents a central portion of the transmissive region, at a position where it will be introduced to the eyepiece window so as to overlap the mask region.

The finder unit may further include an eyepiece lens provided between the eyepiece window and the deflecting optical system and having an optical axis that coincides with the center of the transmissive region. In this case, in a case where the finder unit is utilized as an electronic viewfinder, the display control device would display the image of the subject on the display screen upon correcting for distortion produced by the eyepiece lens (in such a manner that, if the user is looking at the image of the subject through the eyepiece window, the amount of correction is increased the greater the distance from the optical axis of the eyepiece lens).

In a case where the finder unit is utilized as an optical/electronic hybrid viewfinder, the display control device controls the display unit so as to display at least one item of information at such a position where it will be introduced to the eyepiece window so as to overlap the mask region, the item of information being at least one among set status of the camera, a histogram of the image of the subject imaged by the solid-state electronic image sensing device, a graph of focus evaluation values of the image of the subject imaged by the solid-state electronic image sensing device, a reproduced image of an image captured by the camera, imaging assist information and a camera operation manual.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is an example of an optical image of a subject;
FIGS. 7 and 8 are examples of images seen when looking through the finder unit.

DESCRIPTION OF THE PREFERRED EMBODIMENT

Figure 1:
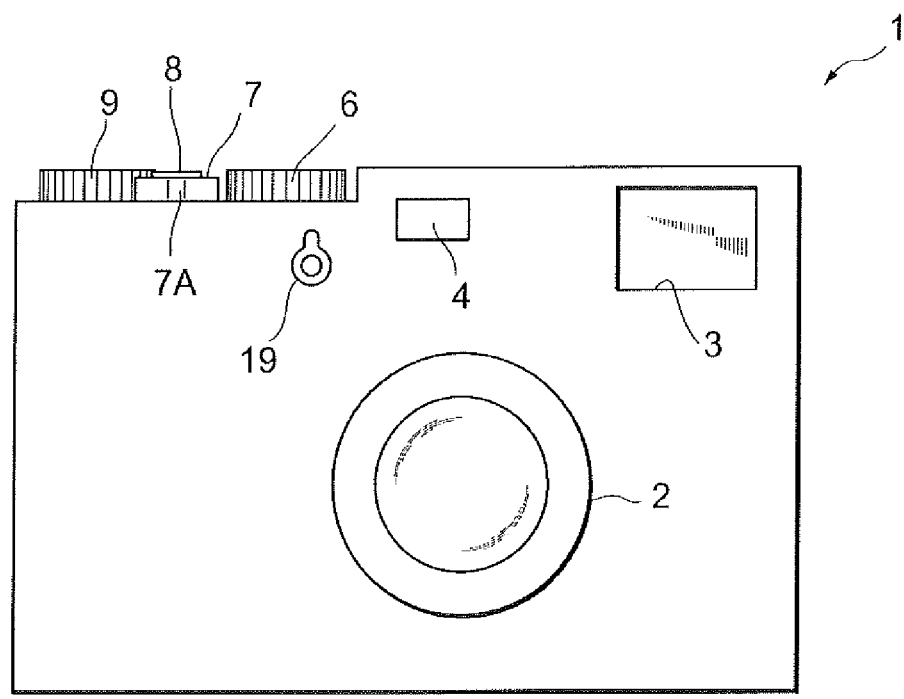
FIG. 1 is a front view of a digital camera.
Figure 2:
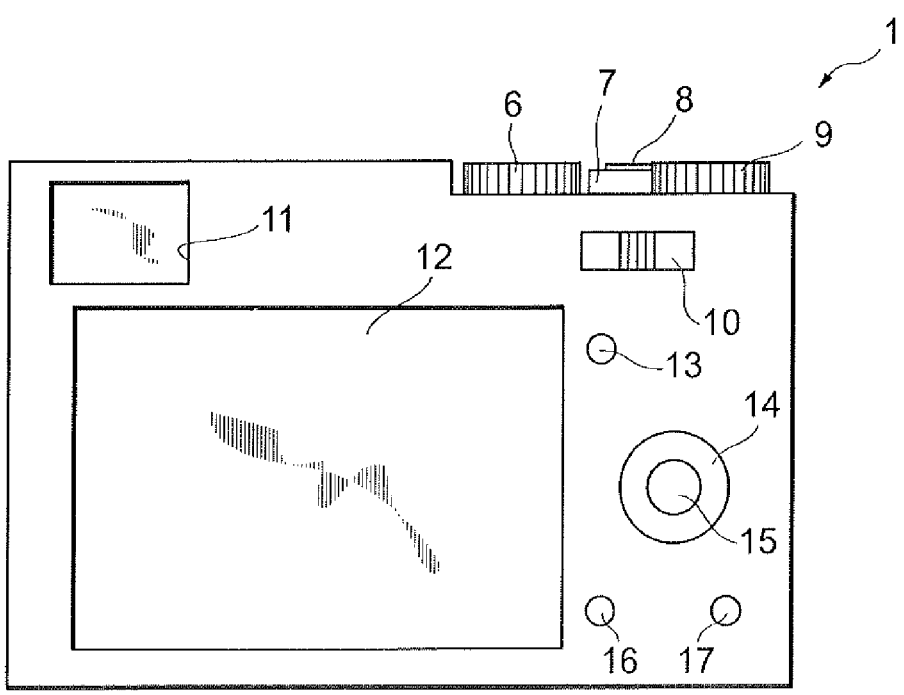
FIG. 2 is a back view of the digital camera.
Figure 3:
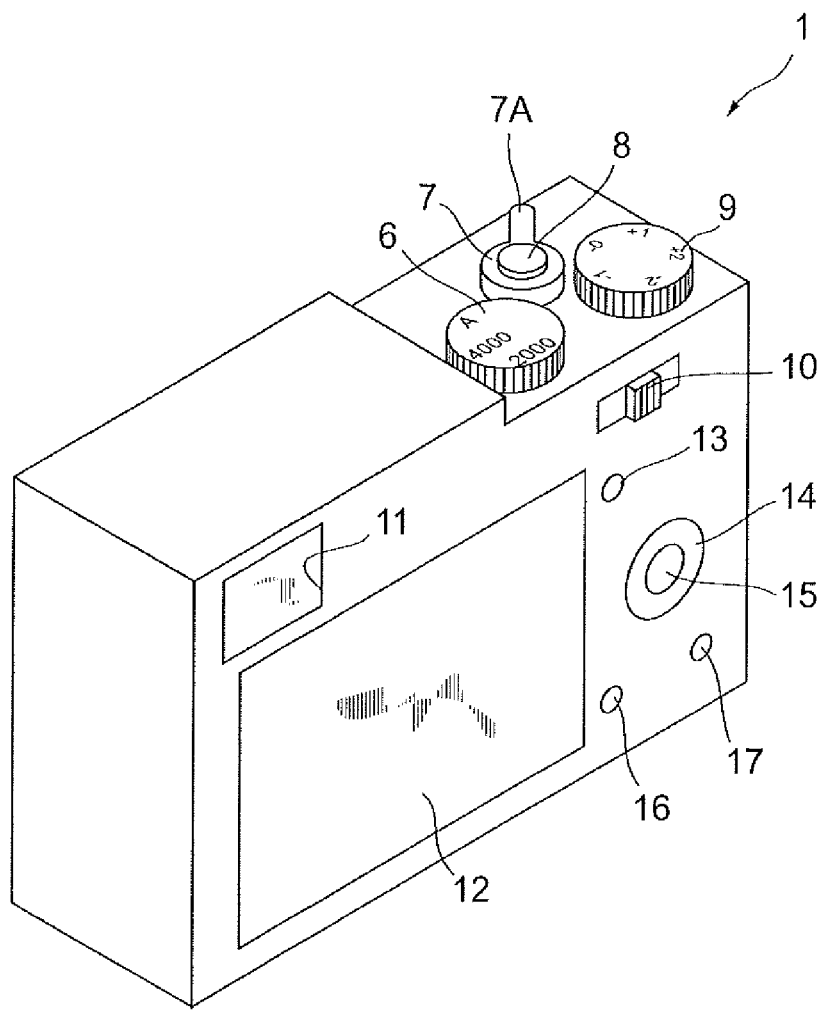
FIG. 3 is a perspective view of the digital camera when viewed from the back.

FIGS. 1 to 3, which illustrate an embodiment of the present invention, show the external appearance of a digital camera 1 FIG. 1 is a front view, FIG. 2 a back view and FIG. 3 a perspective view when viewed from the back.

With reference to FIG. 1, a lens barrel 2 projects forwardly from the approximate center of the front side of the digital camera 1. A finder unit is constructed at the upper right of the digital camera 1 and is formed to include an objective window 3 facing a subject. A flash device 4 is provided on the left side of the objective window 3. As will be described in detail later, the finder unit of this embodiment is capable of being switched between the function of an optical/electronic hybrid viewfinder and the function of an electronic viewfinder function. The optical/electronic hybrid viewfinder function has a function for superimposing information, which is displayed in the electronic viewfinder, on the optical image of a subject obtained by the optical viewfinder. A switching lever 19 for switching between the optical/electronic hybrid viewfinder function and the electronic viewfinder function is provided on the left side of the flash device 4. If the switching lever 19 is tilted leftward when viewed from the front, the finder unit is set to the optical/electronic hybrid viewfinder function. If the switching lever 19 is tilted rightward when viewed from the front, the finder unit is set to the electronic viewfinder function.

A shutter-speed dial 6, a power lever 7, a shutter-release button 8 and an exposure dial 9 are provided on the top of the digital camera 1 on the left side thereof when viewed from the front. The shutter-speed dial 6 is a circular dial that is free to rotate. By rotating the shutter-speed dial 6, the user can set a desired shutter speed. The power lever 7 can be moved through a prescribed angle rightward and leftward as seen from the front. By moving the power lever 7 through the prescribed angle, the user can turn the power supply of the digital camera 1 on and off. The power lever 7 has the shape of a ring with an interior space when viewed from the top (see FIG. 3), and the shutter-release button 8 is provided within the space. The exposure dial 9 also is a circular dial that is free to rotate. By turning the exposure dial 9, the user can correct the exposure.

With reference to FIGS. 2 and 3, a liquid crystal display device 12 is provided on the back side of the digital camera 1 substantially over the entirety thereof. An eyepiece window 11 constituting the finder unit is formed on the back side of the digital camera 1 at the upper left thereof. A command lever 10 movable to the left and right is provided on the back side of the digital camera 1 at the upper right thereof. By manipulating the command lever 10, the user can supply the digital camera 1 with a command such as an aperture adjustment command in steps of ⅓ EV when the camera is in the manual exposure mode.

Provided below the command lever 10 are an AF (autofocus)/AE (autoexposure) lock button 13, a command dial 14, a menu/OK button 15, a back button 16 and a RAW button 17, etc.

With reference primarily to FIG. 3, the shutter-speed dial 6, the power lever 7, the shutter-release button 8 and the exposure dial 9 are provided on the top of the digital camera 1 on the right side thereof (the right side when viewed from the back), as mentioned above. The power lever 7 is formed to have a projection 7A projecting toward the front side. The power supply of the digital camera 1 can be turned on and off by grasping the projection 7A and moving it to the right or left.

By bringing an eye close to the eyepiece window 11 of the finder unit and looking through the eyepiece window 11, the user can view a subject through the objective window 3 and the eyepiece window 11 and can decide the camera angle.

Figure 4:
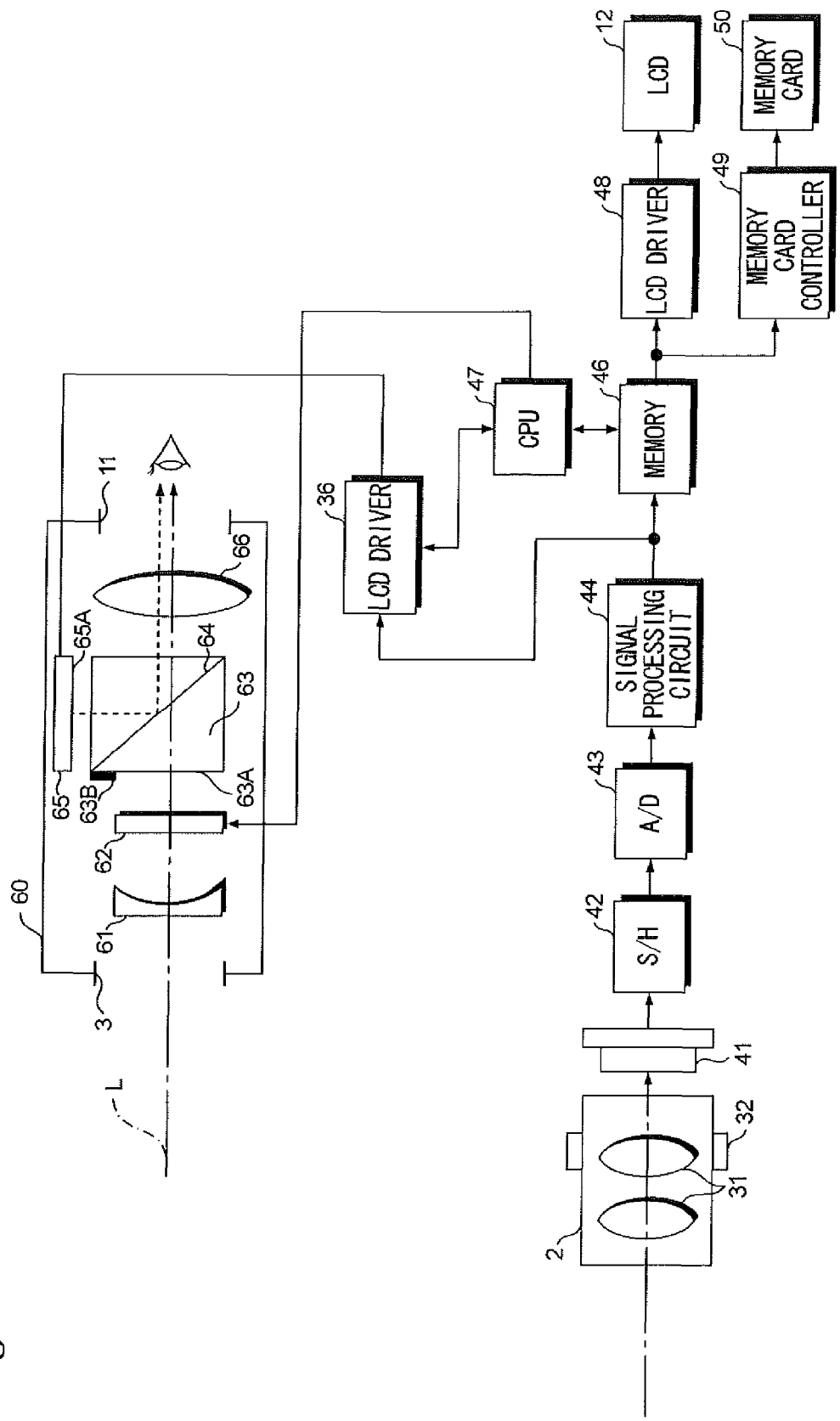
FIG. 4 is a block diagram illustrating the electrical configuration of the digital camera.

FIG. 4 is a block diagram illustrating the electrical configuration of the digital camera 1.

The overall operation of the digital camera 1 is controlled by a CPU 47.

The digital camera 1 includes a solid-state electronic image sensing device 41. A focusing lens group 31 incorporated in the lens barrel 2 is positioned in front of the solid-state electronic image sensing device 41. A freely rotatable focusing ring 32 is provided around the lens barrel 2. The focusing lens group 31 is positioned in accordance with user manipulation of the focusing ring 32.

When a subject is imaged by the solid-state electronic image sensing device 41, a video signal representing the image of the subject is output from the solid-state electronic image sensing device 41. The video signal is input to an analog/digital conversion circuit 43 via a sample/hold circuit 42. The video signal is converted to digital image data by the analog/digital conversion circuit 43. A signal processing circuit 44 subjects the digital image data obtained by the conversion to predetermined signal processing such as a white balance adjustment and gamma correction.

The digital image data that has been output from the signal processing circuit 44 is applied to an LCD (Liquid Crystal Display) driver 48 via a memory 46. The liquid crystal display device 12 (the same reference characters are used to denote the display screen) is controlled by the LCD driver 48 and the image of the subject captured by the solid-state electronic image sensing device 41 is displayed on the display screen of the liquid crystal display device 12.

When the shutter-release button 8 is pressed, the image data that has been input to the memory 46, as mentioned above, is recorded on a memory card 50 under the control of a memory card controller 49.

The image data that has been output from the signal processing circuit 44 is applied to an electronic viewfinder 65 of a finder unit 60 via an LCD driver 36. The electronic viewfinder 65 is a liquid crystal display device. Thus it becomes possible to display the image of the subject, which has been obtained by imaging, on a display screen 65A of the electronic viewfinder 65.

The finder unit 60 is equipped with an eyepiece lens 66 provided in front of the eyepiece window 11. A prism 63 formed to have a half-mirror 64 is provided in front of the eyepiece lens 66. The half-mirror 64 is formed so as to have a 45-degree angle of incidence with respect to optical axis L of the finder unit 60. An OVF (optical viewfinder) shutter (which may be a mechanical shutter or a liquid crystal shutter) 62 and an objective lens 61 are provided in front of the prism 63.

Figure 5:
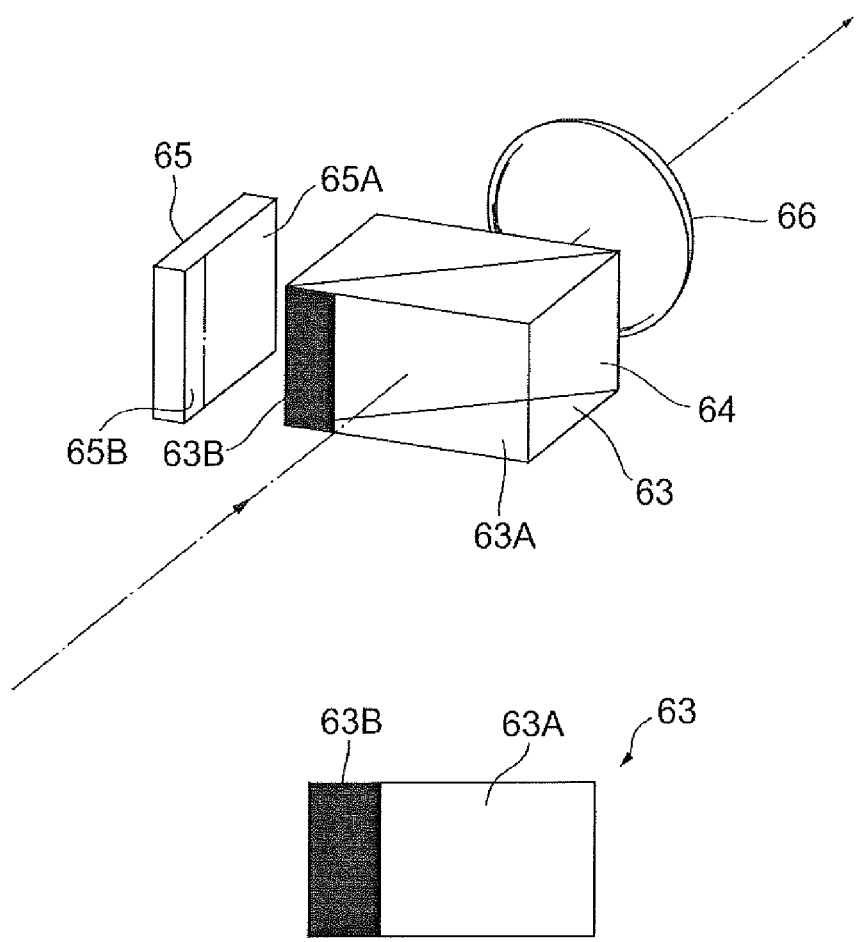
FIG. 5 is a perspective view of some of the components that constitute a finder unit, as well as a front view of a prism.

The diagram at the top of FIG. 5 is a perspective view illustrating the internal configuration of the finder unit 60. In order to facilitate understanding, the objective lens 61 and the OVF shutter 62 are not shown in the diagram at the top of FIG. 5. The diagram at the bottom of FIG. 5 is a front view of the prism 63.

A mask region 63B for blocking light has been formed on part of the front face of the prism 63 that faces the OVF shutter 62. A transmissive region 63A has been defined alongside the mask region 63B. The stipulated aspect ratio of the transmissive region 63A is as follows: horizontal length:vertical length=4:3. The stipulated aspect ratio of the front face of the prism 64, which is the result of combining the transmissive region 63A and mask region 63B, is as follows: horizontal length:vertical length=16:9. It goes without saying that the aspect ratios are not limited to these aspect ratios.

With reference again to FIG. 4, the OVF shutter 62 closes when the camera is set to the electronic viewfinder function. The image of the subject obtained by image capture is displayed on the entire display screen 65A of the electronic viewfinder 65. The displayed image of the subject is reflected by and introduced to the eyepiece window 11 by the half-mirror 64 formed in the prism 63. The user looking through the eyepiece window 11 sees the image of the subject being displayed on the display screen 65A of the electronic viewfinder 65. The display screen 65A of the electronic viewfinder 65 has an aspect ratio identical with that of the front face of the prism 63 consisting of the combination of the transmissive region 63A and the mask region 63B. That is, the stipulated aspect ratio is horizontal length:vertical length=16:9. Thus the user sees the image of the subject whose aspect ratio is horizontal length:vertical length=16:9.

When the OVF shutter 62 is open, the user can see the image of the subject, which has been formed by the objective lens 61 and eyepiece lens 66, through the eyepiece window 11. As mentioned above, the mask region 63B is formed on the front face of the prism 63 and incident light is blocked by the mask region 63B. Consequently, the user looking through the eyepiece window 11 sees the image of the subject formed by light rays that have passed through the transmissive region 63A. Since the mask region 63B is defined on the front face of the prism 63 as described above, the image portion displayed in a display area 65B, which is part of the display screen 65A and is projected upon the portion of the half-mirror 64 that corresponds to the mask region 63B (the portion of the half-mirror 64 where the mask region 63B is projected in a case where the mask region 63B is projected along the direction of the optical axis L of finder unit 60), can be seen by the user looking through the eyepiece window 11 even though the OVF shutter 62 is open. When the OVF shutter 62 is open, the user can see both the optical image of the subject formed by light transmitted through the transmissive region 63A and the image displayed in the display area 65S of the electronic viewfinder 65. In a case where the OVF shutter 62 is closed, as mentioned above, the image of the subject is displayed on the entirety of the display screen 65A inclusive of the display area 65B.

Figure 8:
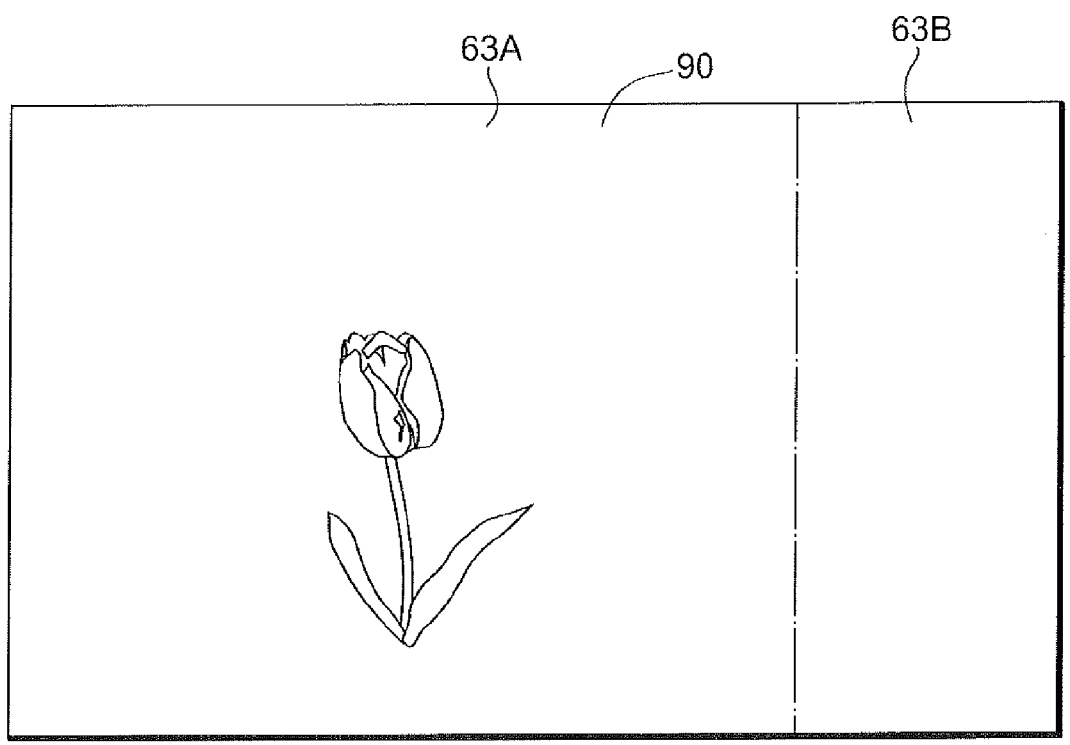

FIGS. 6 to 8 are examples of images that can be seen when looking through the eyepiece window 11 of the finder unit 60.

FIG. 6 is an example of an image seen by looking through the eyepiece window 11 of the finder unit 60 when, in a case where the OVF shutter 62 of the finder unit 60 is open, nothing is being displayed in the display area 65B of the electronic viewfinder 65, as mentioned above.

Since the OVF shutter 62 is open, the user, by looking through the eyepiece window 11, can see an optical image 70 of a subject formed by light rays that have passed through the objective window 3 of the finder unit 60 and been transmitted by transmissive region 63A of the prism 63. In a case where nothing is being displayed in the display area 65B of the electronic viewfinder 65, the user sees the mask region 63B on the right side of the transmissive region 63A. Further, a visual-field frame 80 indicating the imaging zone is displayed in an area of the electronic viewfinder 65 other than the display area 65B. As a result, the visual-field frame 80 is displayed in a form superimposed upon the optical image 70 of the subject.

FIG. 7 is an example of an image seen by looking through the eyepiece window 11 of the finder unit 60 when, in a case where the OVF shutter 62 of the finder unit 60 is open, a portion of the image of the subject imaged by the solid-state electronic image sensing device 41 is displayed in the display area 65B of the electronic viewfinder 65.

Since the OVF shutter 62 is open, the user can see the image 70 of the subject formed by light rays that have passed through the objective window 3 and been transmitted by transmissive region 63A in a manner similar to that shown in FIG. 6. Further, since the visual-field frame 80 is displayed in the area of the electronic viewfinder 65 other than the display area 65B, the visual-field frame 80 indicating the imaging zone is being displayed in FIG. 7 as well. Furthermore, an image 71, which is the result of enlarging the portion of the image of the subject displayed in the central portion of the transmissive region 63A, is being displayed in the display area 65B of the electronic viewfinder 65. Owing to the fact that the portion of the image of the subject captured by the solid-state electronic image sensing device 41 is displayed in the display area 65B of the electronic viewfinder 65, the user looking through the eyepiece window 11 can see the image 71. Thus, the optical image 70 of the subject and the image 71 of the subject captured by the solid-state electronic image sensing device 41 can be viewed simultaneously.

FIG. 8 is an example of an image seen when looking through the eyepiece window 11 of the finder unit 60 in a case where the OVF shutter 62 is closed.

In a case where the OVF shutter 62 is closed, as mentioned above, a subject cannot be seen through the objective window 3. An image 90 of a subject captured by the solid-state electronic image sensing device 41 is displayed on the display screen 65A of the electronic viewfinder 65. Since the display screen 65A of the electronic viewfinder 65 is in landscape orientation, as described above, the image 90 of the subject that can be seen is in landscape orientation. The image 90 of the subject is displayed in a region that is a combination of the transmissive region 63A and the mask region 63B. Although a chain line is drawn along the boundary between the regions 63A and 63B in order to facilitate understanding, it goes without saying that the chain line is not visible. The chain line may be displayed as a matter of course.

Figure 9:
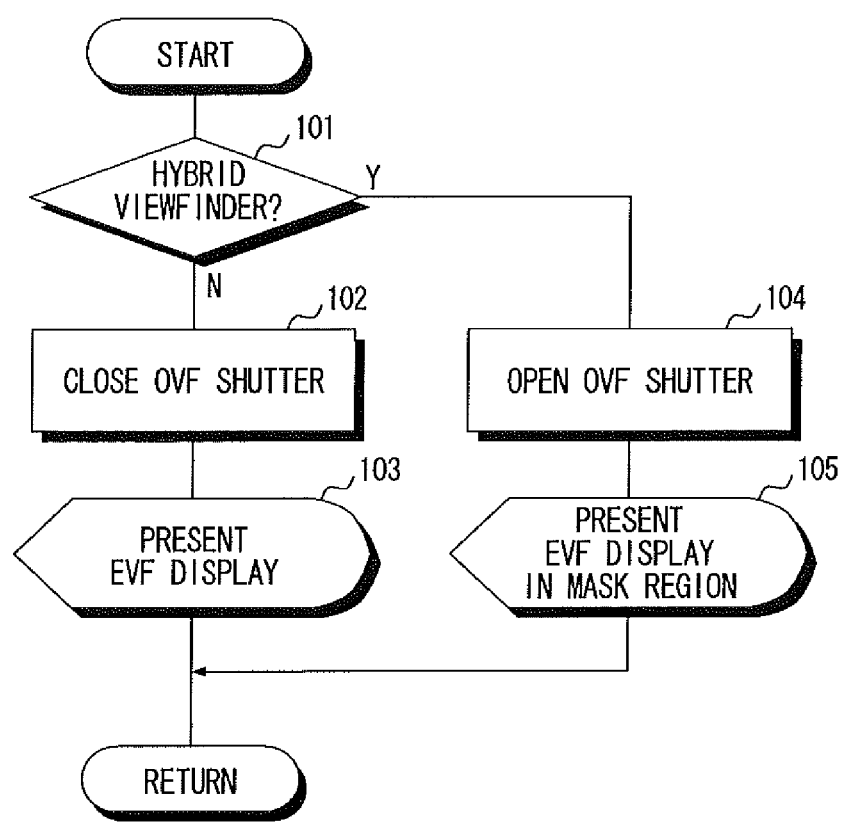
FIG. 9 is a flowchart illustrating processing executed by the digital camera.

FIG. 9 is a flowchart illustrating processing executed by the digital camera 1.

It is determined whether the camera has been set the optical/electronic hybrid viewfinder by the switching lever 19 (step 101).

If the camera has not been set to the optical/electronic hybrid viewfinder ("NO" at step 101), it is construed that the camera has been set to the electronic viewfinder and the OVF shutter 62 is closed (step 102). The image of the subject captured by the solid-state electronic image sensing device 41 is displayed (EVF display) on the display screen 65A of the electronic viewfinder 65 (step 103), as shown in FIG. 8. Since the display screen 65A displays an image of the subject that is in landscape orientation, as mentioned above, the user sees a landscape-oriented image of the subject through the eyepiece window 11.

If the camera has been set to the optical/electronic hybrid viewfinder ("YES" at step 101), the OVF shutter 62 is opened (step 104). The image of the subject (a portion thereof) captured by the solid-state electronic image sensing device 41 is displayed in the display area 65B of the electronic viewfinder 65 (step 105). This means that the optical image 70 of the subject and the image of the subject (a portion thereof) captured by the solid-state electronic image sensing device 41 can be seen, as illustrated in FIG. 7.

In the foregoing embodiment, the photoreceptor surface of the solid-state electronic image sensing device 41 can also utilize an aspect ratio that is horizontal length:vertical length=16:9, which is the same as the aspect ratio of the display screen 65A of the electronic viewfinder 65. By adopting such an arrangement, the landscape-oriented image 90 of the subject can be displayed on the display screen 65A of the electronic viewfinder 65, as shown in FIG. 8, without changing the aspect ratio of the image of the subject captured by the solid-state electronic image sensing device 41. In such case it will suffice to also make the aspect ratio of the imaging zone, which is decided by the visual-field frame 80 indicative of the imaging zone, the aspect ratio horizontal length:vertical length=16:9 in a manner similar to the aspect ratio of the photoreceptor surface of solid-state electronic image sensing device 41. Naturally, the aspect ratio of the imaging zone decided by the visual-field frame 80 need not be the same as that of the solid-state electronic image sensing device 41. For example, the aspect ratio of the imaging zone may be made horizontal length:vertical length=4:3. In such case, when the optical/electronic hybrid viewfinder has been set by the switching lever 19, the optical image of the subject having the 16:9 aspect ratio captured by the solid-state electronic image sensing device 41 would be clipped to the 4:3 aspect ratio and the image data representing the clipped image of the subject would be recorded on the memory card 50. It goes without saying that it may be arranged so that the image data representing the image of the subject having the 16:9 aspect ratio is recorded on the memory card 50 as is.

Figure 10:
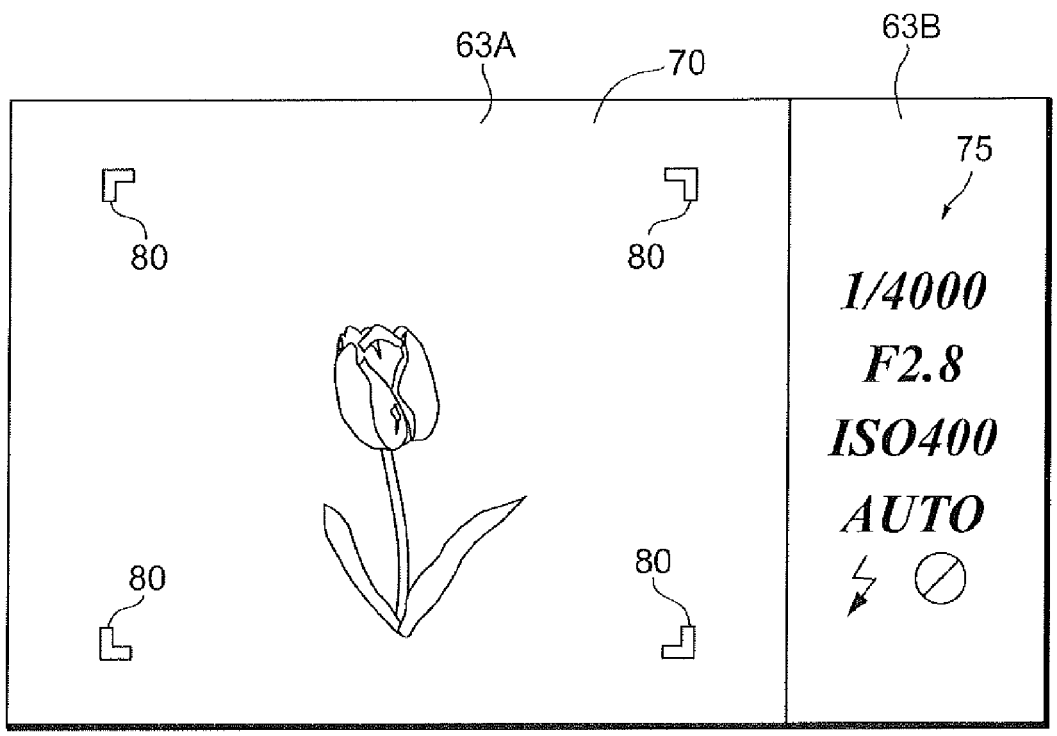
FIG. 10 is an example of an image seen when looking through the finder unit.

FIG. 10, which illustrates a modification, is an example of an image seen through the eyepiece window 11 of the finder unit 60 in a case where the optical/electronic hybrid viewfinder has been set.

In the foregoing embodiment, the captured image of the subject (a portion thereof) is displayed in the display area 65B of the electronic viewfinder 65, thereby enabling the user to view simultaneously the optical image 70 of the subject and the image 71 of the subject obtained by imaging, as shown in FIG. 7. However, in the example shown in FIG. 10, information 75 to which the digital camera 1 has been set, rather than the image 71 of the subject, is displayed in the display area 65B of the electronic viewfinder 65. As a result, by looking through the finder unit 60, the user can see simultaneously the optical image 80 of the subject and the information to which the digital camera 1 has been set. While checking the information to which the digital camera 1 has been set, the user can decide the camera anode by looking at the optical image 70 of the subject. The information 75 is displayed in the display area 65B by being detected by the CPU 47 and applied to the LCD driver 36. In the example shown in FIG. 10, information such as shutter speed, aperture value and sensitivity is being displayed but other information may just as well be displayed.

As illustrated in FIG. 4, the optical axis L of the objective lens 61 and the optical axis L of the eyepiece lens 66 coincide, and these optical axes L coincide with the center of the transmissive region 63A of the prism 63. Owing to lens distortion, the greater the distance from the optical axis L, the greater the distortion of the image 70 of the subject that will be formed. If the center of the transmissive region 63A of the prism 63, the optical axis L of the objective lens 61 and the optical axis L of the eyepiece lens 66 coincide, the optically formed image 70 of the subject sustains distortion evenly from the center toward the outer side thereof, as illustrated in FIG. 7. On the other hand, as shown in FIG. 8, in a case where the captured image 90 of the subject is displayed on the entirety of the display screen 65A of the electronic viewfinder 65 and the image 90 of the subject formed by the eyepiece lens 66 is viewed, the center of the image 90 of the subject and the center of the eyepiece lens 66 will not coincide. Consequently, rather than the image 90 of the subject sustaining distortion uniformly from the center toward the outer side thereof, the right-side portion of the image 90 is distorted more than the left-side portion.

Figure 11:
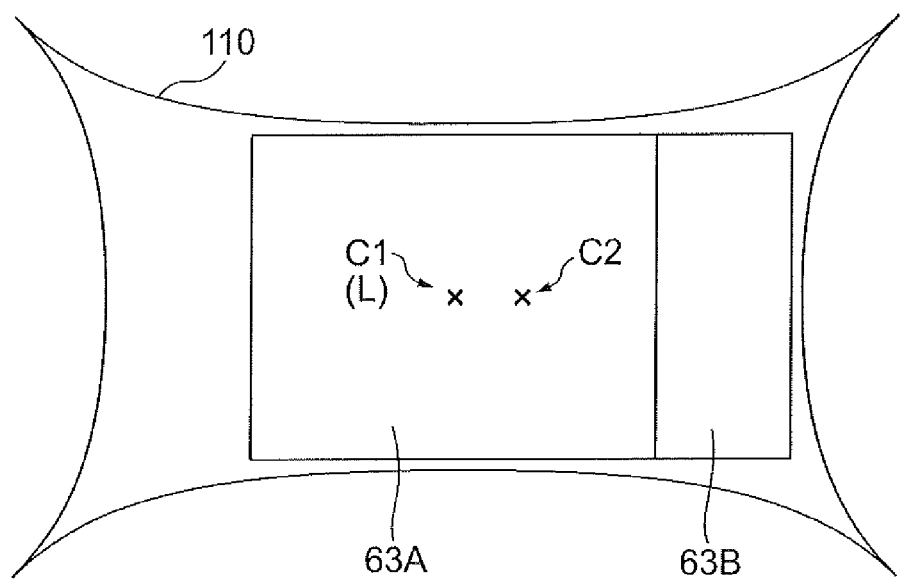
FIG. 11 illustrates the manner in which the image of a subject is distorted due to lens distortion.
Figure 12:
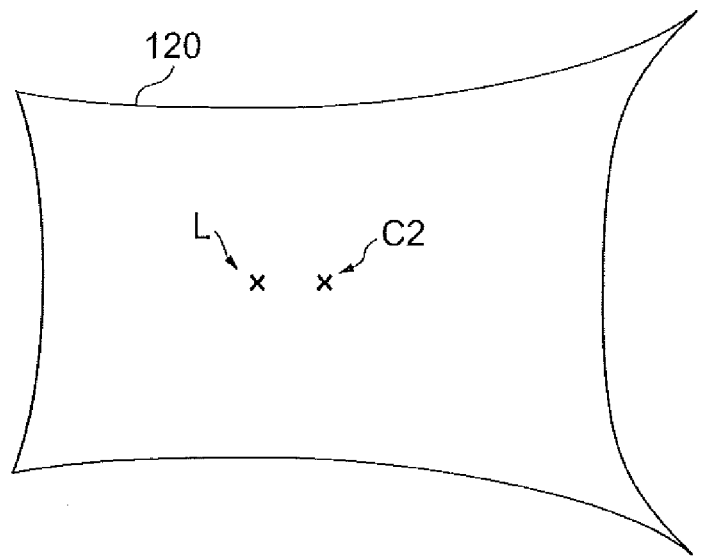
FIG. 12 illustrates the manner in which the image of a subject is distorted.
Figure 13:
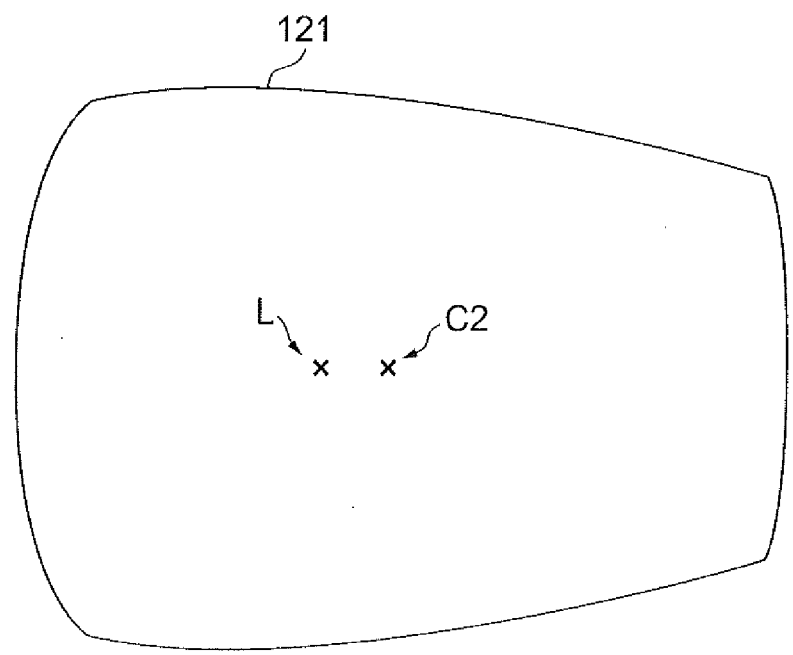
FIG. 13 is an example of the image of a subject that has been corrected for distortion.

FIGS. 11 to 13 relate to a distortion correction when the center of the image of the subject displayed in the electronic viewfinder 65 and the optical axis L of the eyepiece lens 66 do not coincide.

FIG. 11 illustrates the manner in which the image of a subject is distorted by the eyepiece lens 66 as described above.

The optical image of a subject formed by the eyepiece lens 66 through the objective window 3 and the image of a subject displayed in the electronic viewfinder 65 and formed by the eyepiece lens 66 are both represented by a subject image 110. Distortion of the image of the subject due to distortion ascribed to the eyepiece lens 66 increases with greater distance from the optical axis L of the eyepiece lens 66. If the image 110 of the subject is the optical image of the subject formed by the eyepiece lens 66, then center C1 of this optical image of the subject and the optical axis L of the eyepiece lens 66 will coincide. Therefore, the image is distorted more uniformly as the outer side of the image of the subject is approached from the center thereof. On the other hand, if the image 110 of the subject is the image of the subject displayed on the display screen 65A of the electronic viewfinder 65 and formed by the eyepiece lens 66, then center C2 of this image of the subject and the optical axis L of the eyepiece lens 66 will not coincide. As a consequence, the image of the subject seen through the eyepiece lens 66 is a distorted image having left-right asymmetry.

FIG. 12 is an example of an image 120 of a subject displayed on the display screen 65A of the electronic viewfinder 65 and distorted owing to distortion ascribed to the eyepiece lens 66.

Since the optical axis L of the eyepiece lens 66 does not pass through the center of the image 120 of the subject, the amount of distortion on the right side is greater than that on the left side owing to distortion due to the eyepiece lens 66, as mentioned above. Consequently, even if a distortion correction is applied to the subject image 120 in such a manner that, the greater the distance from the center C2 of the subject image 120, the smaller the amount of distortion (the greater the amount of correction), an accurate distortion correction cannot be achieved. In this embodiment, a distortion correction is applied to the subject image 120 in such a manner that the greater the distance from the optical axis L of the eyepiece lens 66, rather than the distance from the center C2 of the subject image 120, the smaller the amount distortion.

FIG. 13 is an example of a subject image 121 that has been corrected for distortion.

As mentioned above, distortion has been corrected for in such a manner that the greater the distance from the optical axis L of the eyepiece lens 66, the smaller the amount of distortion. This subject image 121 is displayed on the display screen 65A of the electronic viewfinder 65. By viewing the image through the eyepiece lens 66, the user can see the image of the subject from which the effects of distortion due to the eyepiece lens 66 have been removed.

In the foregoing embodiment, a portion of the captured image of a subject (see FIG. 7) and information that has been set in the digital camera 1 (see FIG. 10), etc., are displayed in the display area 65B of the electronic viewfinder 65. However, it may be arranged so that other items of information and the like are displayed. For example, it may be arranged to display a histogram such as a histogram of brightness of the captured image of a subject, a graph of focus evaluation values of the captured image of a subject, a reproduced image of image data that has been recorded on the memory card 50, imaging assist information (an explanation of modes, an explanation of operation, etc.) and an operation manual (an explanation of manipulated buttons and dials). For example, by displaying a reproduced image, the user can check the framing of an image to be captured next.

Furthermore, in the foregoing embodiment, the mask region 63B in which it is possible to view information and the like displayed in the display area 65B of the electronic viewfinder 65 is defined on the right side of the transmissive region 63A in which the optical image of a subject can be seen, as shown in FIG. 7. However, the mask region 63B may just as well be defined on the left side of the transmissive region 63A, or the mask region 63B may just as well be defined on the upper side or on the lower side of the transmissive region 63A.

Furthermore, in the foregoing embodiment, the camera is switched between the optical/electronic hybrid viewfinder and the electronic viewinder. However, as shown in FIG. 6, it may be arranged to make it possible to make optical viewfinder settings in which nothing is displayed in the display area 65S of the electronic viewfinder 65.

As many apparently widely different embodiments of the present invention can be made without departing from the spirit and scope thereof, it is to be understood that the invention is not limited to the specific embodiments thereof except as defined in the appended claims.

What is claimed is:

1. A camera comprising:
   a finder unit formed on the front of the camera and having an objective window facing a subject and an eyepiece window for looking at an optical image of the subject seen through the objective window;
   a solid-state electronic image sensing device for imaging a subject and outputting image data representing the image of the subject;
   a display unit for displaying an image of the subject, which has been imaged by said solid-state image sensing device, on a display screen;
   a deflecting optical system in which there are formed a transmissive region, which transmits the optical image of the subject seen through the objective window, and a mask region defined along the horizontal direction or vertical direction of the transmissive region for blocking entrant light, the deflecting optical system introducing the image of the subject, which is being displayed on the display screen of said display unit, to the eyepiece window;

a shutter device, which is provided between the subject and said deflecting optical system, for freely blocking light rays impinging thereon through the objective window;

a shutter control device for controlling said shutter device so as not to block the light rays impinging thereon through the objective window in a case where said finder unit is utilized as an optical/electronic hybrid viewfinder, and controlling said shutter device so as to block the light rays impinging thereon through the objective window in a case where said finder unit is utilized as an electronic viewfinder; and a display control device for controlling said display unit so as to display the image of a subject, which represents a central portion of the transmissive region, at such a position where it will be introduced to the eyepiece window so as to overlap the mask region in a case where said finder unit is utilized as an optical/electronic hybrid viewfinder, and controlling said display unit so as to display the image of the subject at such a position where it will be introduced to the eyepiece window so as to overlap a region, which is a combination of the mask region and the transmissive region, in a case where said finder unit is utilized as an electronic viewfinder.

2. The apparatus according to claim 1, wherein said finder unit further includes an eyepiece lens provided between the eyepiece window and said deflecting optical system and having an optical axis that coincides with the center of the transmissive region; and in a case where said finder unit is utilized as an electronic viewfinder, said display control device displays the image of the subject on the display screen upon correcting for distortion produced by the eyepiece lens.

3. The apparatus according to claim 1, wherein in a case where said finder unit is utilized as an optical/electronic hybrid viewfinder, said display control device controls said display unit so as to display at least one item of information at such a position where it will be introduced to the eyepiece window so as to overlap the mask region, the item of information being at least one among set status of the camera, a histogram of the image of the subject imaged by said solid-state electronic image sensing device, a graph of focus evaluation values of the image of the subject imaged by said solid-state electronic image sensing device, a reproduced image of an image captured by the camera, imaging assist information and a camera operation manual.

4. A method of controlling operation of a camera which includes a finder unit formed on the front of the camera and having an objective window facing a subject and an eyepiece window for looking at an optical image of the subject seen through the objective window, said method comprising steps of:

a solid-state electronic image sensing device imaging a subject and outputting image data representing the image of the subject;

a display unit displaying an image of the subject, which has been imaged by the solid-state image sensing device, on a display screen;

a deflecting optical system introducing the image of the subject, which is being displayed on the display screen of the display unit, to the eyepiece window, wherein there are formed in the deflecting optical system a transmissive region, which transmits the optical image of the subject seen through the objective window, and a mask region defined along the horizontal direction or vertical direction of the transmissive region for blocking entrant light;

a shutter device, which is provided between the subject and the deflecting optical system, freely blocking light rays impinging thereon through the objective window;

a shutter control device controlling the shutter device so as not to block the light rays impinging thereon through the objective window in a case where the finder unit is utilized as an optical/electronic hybrid viewfinder, and controlling the shutter device so as to block the light rays impinging thereon through the objective window in a case where the finder unit is utilized as an electronic viewfinder; and a display control device controlling the display unit so as to display the image of a subject, which represents a central portion of the transmissive region, at such a position where it will be introduced to the eyepiece window so as to overlap the mask region in a case where the finder unit is utilized as an optical/electronic hybrid viewfinder, and controlling the display unit so as to display the image of the subject at such a position where it will be introduced to the eyepiece window so as to overlap a region, which is a combination of the mask region and the transmissive region, in a case where the finder unit is utilized as an electronic viewfinder.

* * * * *